UNITED STATES PATENT OFFICE.

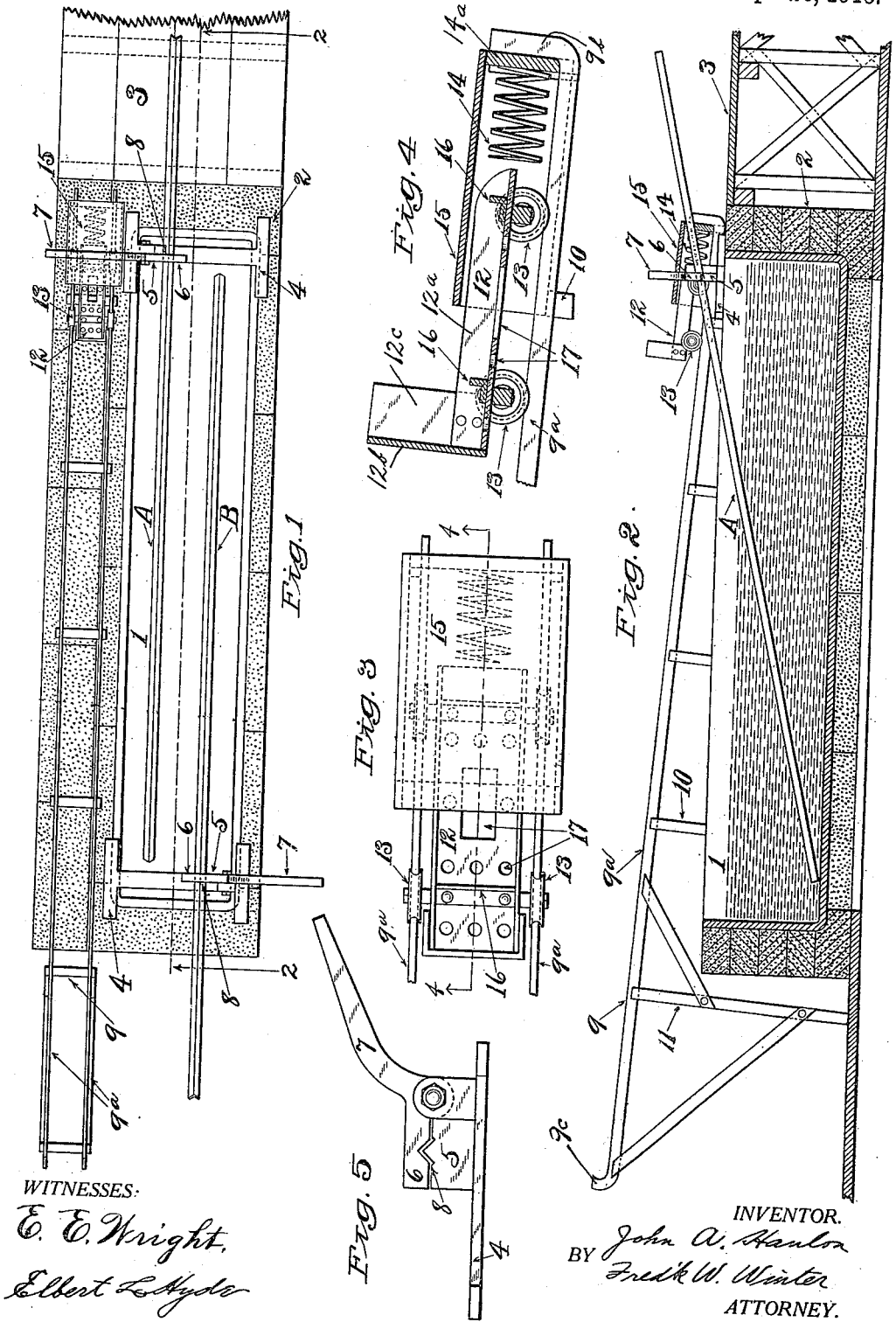

JOHN A. HANLON, OF PITTSBURGH, PENNSYLVANIA, ASSIGNOR TO HANLON-GREGORY GALVANIZING COMPANY, OF PITTSBURGH, PENNSYLVANIA, A CORPORATION OF PENNSYLVANIA.

TRANSFER APPARATUS FOR GALVANIZING-POTS.

1,136,523.   Specification of Letters Patent.   Patented Apr. 20, 1915.

Application filed February 3, 1913. Serial No. 745,912.

*To all whom it may concern:*

Be it known that I, JOHN A. HANLON, a resident of Pittsburgh, in the county of Allegheny and State of Pennsylvania, have invented a new and useful Improvement in Transfer Apparatus for Galvanizing-Pots, of which the following is a specification.

This invention relates to apparatus for coating angles, channels, flat or round bars or rods, pipe, etc., with metal, and particularly for coating articles which are longer than the coating pot or kettle and which must be transferred from end to end of the coating pot or kettle.

The object of the invention is to provide simple and inexpensive apparatus for transferring the bar or other article being coated from end to end of the pot or kettle and by means of which the output of a given coating pot or kettle is increased.

In the accompanying drawings Figure 1 is a plan view of a kettle or pot having my improvement applied thereto; Fig. 2 is a longitudinal vertical section through the same on the line 2—2, Fig. 1; Fig. 3 is a plan view of the carriage and the lower end of the transfer device; Fig. 4 is a vertical longitudinal section on the line 4—4, Fig. 3; and Fig. 5 is an elevation showing one of the scrapers or wipers.

In coating steel or iron bars, rods, angles, pipe, flats or other sections with metal, such as zinc or lead or compositions thereof, it is customary to dip or immerse the rods or bars into a molten bath of the metal contained in a long pot or kettle. These pots or kettles are of various sizes but on account of their cost and particularly the cost of the bath, it is not usual to have them more than fourteen feet long and three feet wide, such a pot or kettle costing approximately one thousand dollars and the bath therein approximately four thousand dollars. When it becomes necessary to coat bars, rods, pipes or other articles of greater length than the pot or kettle, instead of going to the expense of building a pot or kettle long enough to take the entire length of such articles, it is the practice to insert one end of the article into the pot or kettle, leave the same rest therein in inclined position the proper length of time, then withdraw the same endwise, preferably through a wiper to remove the surplus metal, carry such article endwise to the other end of the tank and insert the uncoated end therein in the same manner as the first end, and then again withdraw said article or bar through a wiper. This dipping of the two ends of the article successively and carrying the article from one end to the other of the tank or pot, requires considerable time and necessitates manual labor which is hard in case of heavy articles and which is disagreeable on account of the heat and fumes from the pot or kettle, to such an extent that it is difficult to obtain men to do this work and retain them long enough to become skilled.

The object of the present invention is to reduce the cost, and the amount and arduousness of the labor necessary to coat bars, rods or other articles of greater length than the pot or kettle.

In the drawings the pot or kettle is indicated at 1, and is mounted in a suitable setting or foundation 2 and is filled to the required depth with the molten coating metal. At one end of the pot or kettle is a platform 3 for the workman who introduces the bars or rods into the pot. At each end of the pot or kettle in proper position for the rod or bar to be drawn therethrough, are scraping or wiping devices for removing the superfluous coating metal and dross. These may be of various characteristics and, as shown, each comprises a base 4 resting upon the side walls of the kettle or setting and carrying a fixed wiper blade or plate 5 and a pivoted wiper blade or plate 6, the latter being provided with a handle 7 for opening the wiper blades. The meeting edges of the blades are shaped, as at 8, to correspond with the cross section of the rod or bar being coated.

At one side of the pot or kettle and preferably supported on the side wall of the setting 2 is a suitable track 9 for the transfer carriage, said track comprising rails 9ª supported by legs 10 and 11, or they may, if desired, be suspended from overhead. On this track is a transfer car or carriage 12 provided with wheels 13 running on the track, and being so formed as to support the end of a freshly coated bar or rod and be pushed up the inclined track to the other end of the tank. The bottom of the carriage is provided with drainage openings 17 and with transverse angle members 16 upon which the end of the coated bar rests and which present only a small surface to prevent as far as possible the marring of the fresh coat. In order to prevent the end of the bar or rod when being pushed upon, from slipping off the car, the latter is provided with comparatively shallow side walls 12ª and a high end wall 12ᵇ having longitudinal side flanges 12ᶜ.

At the lower end of the track is a suitable buffer mechanism comprising a spring 14 secured to a cross bar 14ª held by the upturned ends 9ᵇ of the rails 9ª. A cover plate 15 projects over the buffer 14 and partly over the carriage 12 when the latter is at the lower end of the transfer track, and serves to prevent the car from jumping off the track. The track, as shown, is somewhat longer than the pot or kettle and at its upper end is upturned as at 9ᶜ, to prevent the car from running off at that end.

The apparatus is used in the following manner: The bars or rods to be coated are handled in batches of say fifteen, only two bars A and B being shown in the drawings, one inserted from each end of the pot or kettle, and which rest in the pot or kettle in oppositely inclined positions. When a bar A is sufficiently coated a workman standing on the platform 3 seizes the upper end of the same and places it in position between the scraping blades 5 and 6 which are then pressed together by the lever 7. He then walks backwardly on the platform 3 and draws the bar or rod through the scraping device to remove the superfluous metal and dross which falls back into the pot or kettle. When entirely drawn through the scraping device, another workman standing on the floor on the track side of the pot or kettle grasps the forward end of the bar or rod by a suitable tool or by hand and places it in the carriage 12 which is at the lower end of the transfer track. The first workman then walks forwardly, pushing the car ahead of him and upwardly along the inclined track until it reaches the upper end thereof. The floor workman then takes the rear end of the bar or rod and lowers it down into the pot or tank, to the position indicated at B, Fig. 1, a third workman simultaneously removing the forward or upper end of the bar or rod from the carriage. This permits the carriage to at once run back by gravity to its initial position. The first workman then grasps a second bar or rod and proceeds as before, the third workman at the same time taking a previously dipped bar or rod B and withdrawing it through the two scraping or wiping devices 4 in the same manner as the first workman withdraws the bar A. Any arrangement of track and carriage whereby the carriage automatically returns to the entering end of the track, is within the scope of the invention.

The apparatus described enables bars or rods which are considerably longer than an available melting pot or tank to be coated expeditiously and with a minimum amount of labor, and reduces the arduousness of the labor to such an extent that the output is very considerably increased.

What I claim is:—

1. Apparatus for coating strips or bars, comprising a pot in which the strips or bars to be coated are laid, said pot being shorter than said strips or bars, a track extending from a point near one end of said pot to a point beyond the other end thereof, and a carriage on said track adapted to support and carry one end of a strip or bar while the same is moved from one end of the pot to the other for coating its other end.

2. Apparatus for coating strips or bars, comprising a pot shorter than the strips or bars to be coated, a track longer than said pot and extending lengthwise thereof, a wiping or scraping device at one end of said pot, a carriage normally lying on said track at said end of the pot and adapted to support and carry one end of the strip or bar and to be moved along said track to transfer a strip or bar to the other end of said pot, said track being so constructed and arranged that the carriage automatically returns to normal position when the strip or bar is removed therefrom.

3. Apparatus for coating strips or bars, comprising a pot shorter than the strips or bars to be coated, an inclined track extending lengthwise of said pot with its lower end near one end of said pot and its upper end at a point beyond the other end thereof, and a carriage normally lying at the lower end of said track and adapted to support and carry one end of a strip or bar and to be moved upwardly along said track to transfer a strip or bar to the other end of said pot.

4. Apparatus for coating strips or bars, comprising a pot shorter than the strips or bars to be coated, an inclined track extending lengthwise of said pot with its lower end near one end of said pot and its upper end at a point beyond the other end thereof, and a carriage normally supported at the lower end of said track and adapted to support and carry one end of a strip or bar and to be moved upwardly along said track to transfer a strip or bar from one end to the other of said pot, said carriage having a perforated bottom for draining off the excess material.

5. Apparatus for coating strips or bars, comprising a pot shorter than the strips or bars to be coated, an inclined track extending lengthwise of said pot with its lower end near one end of said pot and its upper end at a point beyond the other end thereof, a carriage normally supported at the lower end of said track and adapted to support and carry one end of a strip or bar and to be moved upwardly along said track to transfer a strip or bar from one end to the other of said pot, and a support in said carriage for the strips or bar.

6. Apparatus for coating strips or bars, comprising a pot shorter than the strips or bars to be coated, an inclined track extending lengthwise of said pot with its lower end near one end of said pot and its upper end at a point beyond the other end thereof, a carriage normally supported at the lower end of said track and adapted to support and carry one end of a strip or bar and to be moved upwardly along said track to transfer a strip or bar from one end to the other of said pot, and a buffer member at the lower end of the track.

7. Apparatus for coating strips or bars, comprising a pot shorter than the strips or bars to be coated, an inclined track extending lengthwise of and longer than said pot, a carriage normally supported at the lower end of said track and adapted to support and carry one end of a strip or bar and to be moved upwardly along said track to transfer a strip or bar from one end to the other thereof, and means located at the lower end of said track for preventing said carriage from leaving the track when it reaches the lower end thereof.

8. Apparatus for use with galvanizing pots for coating strips or bars, comprising a track longer than the pot and located at one side thereof and extending from a point near one end of said pot to a point beyond the other end thereof, and a carriage on said track adapted to support and carry one end of a strip or bar while the same is moved from one end of the pot to the other, said carriage being arranged to normally occupy a position at one end of said pot.

9. Apparatus for use with galvanizing pots for coating strips or bars, comprising a track longer than said pot and located at one side thereof, said track being inclined with its lower end near one end of said pot and its upper end at a point beyond the other end thereof, a carriage freely movable on said track and adapted to support one end of a strip or bar while the same is moved from one end of the pot to the other, and a buffer at the lower end of said track arranged to coöperate with said carriage.

In testimony whereof I have hereunto set my hand.

JOHN A. HANLON.

Witnesses:
ELBERT L. HYDE,
I. C. STAVER.

Copies of this patent may be obtained for five cents each, by addressing the "Commissioner of Patents, Washington, D. C."